June 26, 1962  J. C. TURNBULL  3,041,127
METHOD OF FABRICATING A CATHODE RAY TUBE
Original Filed April 21, 1955 2 Sheets-Sheet 1
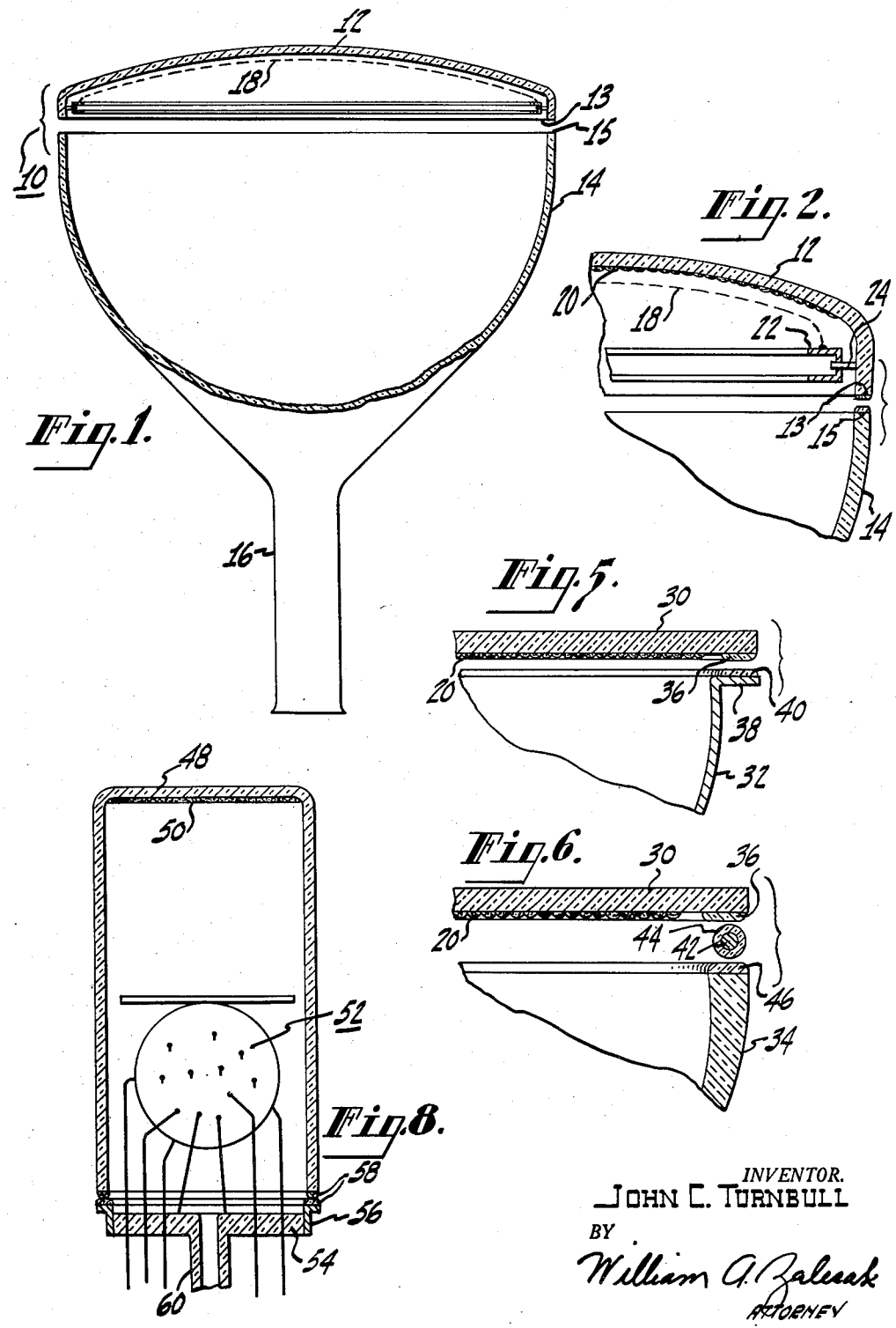
INVENTOR.
JOHN C. TURNBULL
BY
William A. Zalesak
ATTORNEY June 26, 1962  J. C. TURNBULL  3,041,127
METHOD OF FABRICATING A CATHODE RAY TUBE
Original Filed April 21, 1955  2 Sheets-Sheet 2
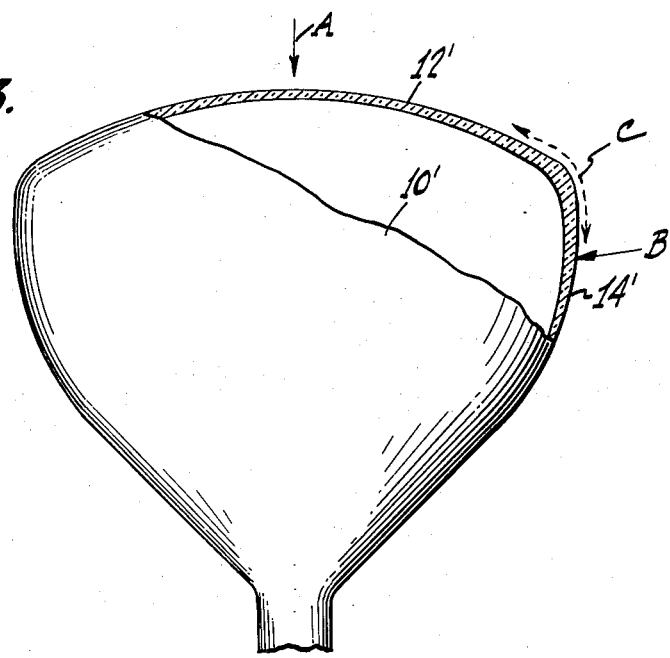
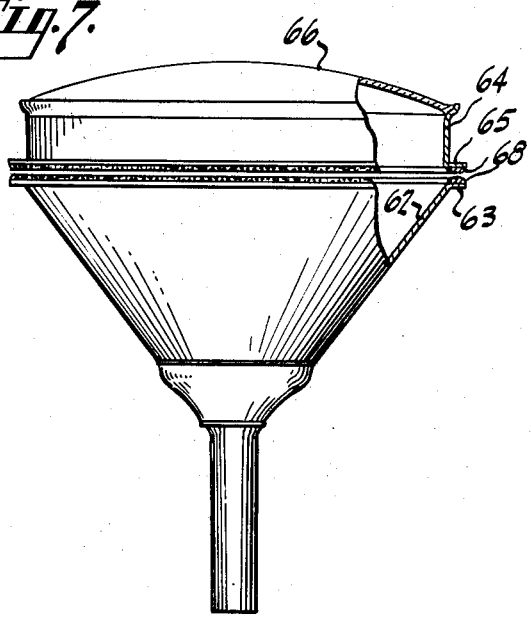
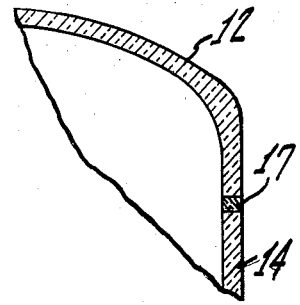
INVENTOR.
JOHN C. TURNBULL
BY
William A. Zaleski
ATTORNEY

3,041,127
METHOD OF FABRICATING A CATHODE RAY TUBE

John C. Turnbull, Lancaster, Pa., assignor to Radio Corporation of America, a corporation of Delaware
Continuation of application Ser. No. 502,837, Apr. 21, 1955. This application Dec. 22, 1959, Ser. No. 862,441
10 Claims. (Cl. 316—19)

This invention relates to the fabrication of cathode ray tubes.

This application is a continuation of my copending application, Serial Number 502,837, filed April 21, 1955, now abandoned.

In the field of electronic tube manufacture, the use of low temperature solder glass seals has in the past been made in forming glass to glass, glass to metal and ceramic to metal seals. These seals have been used in joining envelope portions of electronic tubes to provide an envelope which could be evacuated and processed at elevated temperatures.

Soft enamels or glasses have been used for making these seals between glass or metal components, whose surfaces fit closely together, by applying the solder glass to one or both sealing surfaces and heating the parts together with the sealing surfaces in contact.

The range of thermal expansion coefficient of glasses, which have been used in fabricating tube envelope parts, is between 85 and $100 \times 10^{-7}$/degree centigrade. The commonly used bulb glasses have an expansion coefficient of $88-91 \times 10^{-7}$/degree centigrade. Solder glasses used to join glass parts of this expansion range and which have matching expansion characteristics also have a minimum softening point of around 440° C. Thus, sealing temperatures of at least 515° C. and usually in a range of 550° C. to 660° C. have been used. These temperatures are below the softening temperatures of the glass parts sealed but above that of the solder glass used.

Solder glasses compounded to provide lower sealing temperatures inherently result in higher expansion coefficients, and such solder glasses have matching expansion characteristics with bulb glasses having expansion coefficients in excess of $100 \times 10^{-7}$/degree centigrade. If the commonly used bulb glasses, with expansion between 88 and $91 \times 10^{-7}$/degrees centigrade are used, there is excessive mismatching of the solder glass and the glass tube components which provides seals that are not reliable and not vacuum tight. Thought there are numerous solder glasses with softening temperatures in the 350° C. to 400° C. range, none of these have expansion characteristics matching the commercial glasses, having an expansion range of $85-95 \times 10^{-7}$ degree centigrade (0° to 300° C.), which are commonly used for tube envelope parts.

The relatively high temperatures set forth above and which have been previously used in making glass seals have been an objectionable feature in the uses of solder glass seals in many applications. The direct sealing of glass to glass parts and glass to metal parts without solder glasses of necessity takes place at relatively high temperatures in excess of 800° C., well above the softening temperatures of commercial glasses. Immediately after sealing, the bulb in addition must be annealed by heating it uniformly to temperatures somewhat above the annealing temperature of the bulb glass (i.e., 460-470° C. for glasses such as Corning 9010 or 9012). These elevated sealing temperatures generally are used only for forming empty envelopes to be used for electronic tubes. For example, joining the faceplate of a cathode ray tube to the bulb portion of the envelope at such elevated temperatures might preclude the prior formation of the phosphor screen on the surface of the faceplate.

In the fabrication of color television tubes it is, however necessary to form the phosphor pattern on the tube faceplate before the plate is joined to the rest of the tube envelope. This has required an envelope in which the faceplate or cap portion and the bulb portion of the envelope are furnished each with a metal flange projecting outwardly. The metal flanges are then joined by a welding operation and in a manner as not to reduce the sensitivity of the phosphor materials on the inner surface of the faceplate. This procedure is relatively slow and also involves expensive envelope components, as well as welding equipment. Decided advantages would result by joining the glass faceplate cap of such a tube by a direct seal, without use of metal welding flanges, to the bulb portion of the envelope at sufficiently low temperatures to prevent injury to the phosphor coatings or to the mask structure of a shadow mask color tube. A low temperature glass to glass or glass to metal seal would also be a decided advantage in joining tube parts adjacent to sensitized photosurfaces or secondary emission dynode electrodes. A low temperature seal in these applications would allow the use of smaller envelope structures without the danger of lessening the sensitivities of sensitive tube parts.

Another advantage in using low temperature glass seals would be in sealing glass parts having specially formed surfaces or shapes or parts formed of tempered glass having compressive surface stresses. High temperature seals at temperature around the softening point of such glasses and above their annealing points introduce unwanted distortions of the glass parts, and also cause the desired compressive surface stresses of tempered glass to be removed by annealing.

Electronic tube devices normally pass through a heat treatment or bake-out at temperatures in the neighborhood of 400° to 430° C. The purpose of this bake-out treatment is to heat the glass and metal parts of the tube to sufficiently high temperatures at which occluded gases in the surfaces of the glass and metal parts of the tube are released and pumped out of the tube. This treatment insures that these gases will not be released during tube operation at lower temperatures. The bake-out temperatures vary according to the tube type fabricated. However, the temperatures are chosen sufficiently low to prevent any damage to sensitive parts within the tube such as phosphor surfaces, shadow mask structures, photosensitive coatings, dynode surfaces, etc.

It is therefore an object of this invention to provide a novel method of fabricating a cathode ray tube.

It is also an object of this invention to provide a novel method of joining glass to glass and glass to metal components of electronic tube devices at relatively low temperatures.

It is a further object of this invention to provide a novel method for directly sealing glass parts and metal parts together at relatively low temperatures below the annealing temperatures of the glass parts.

It is another object of this invention to provide a novel method for sealing glass and metal parts together of electronic tube devices at a relatively low temperature range and within the range of normal tube processing temperatures.

It is another object of this invention to provide a novel method for sealing glass and metal parts together at relatively low temperatures, below the temperatures at which the glass bulb parts will distort, either under their own weight, or under the forces of external pressure.

In one embodiment of the invention a low temperature glass frit is used to join together glass parts and metal parts at relatively low temperatures. The method makes use of moderate pressure applied between the parts to be sealed as a means of reducing the sealing temperatures with soft glass solders. Pressures ranging from 100 to 7000 pounds per square inch applied to seal areas have greatly improved the bond strength of soft glass solder seals made at lower temperatures. Vacuum-tight seals with high bond strength can be made at the softening point of the solder glass.

FIG. 1 is a partial sectional view of portions of a glass envelope to be sealed together in accordance with the invention.

FIG. 2 is an enlarged sectional view of a portion of the structure of FIG. 1.

FIG. 3 is a partial sectional view of a conventional glass cathode ray tube envelope.

FIG. 4 is a partial sectional view of a cathode ray tube made in accordance with the invention.

FIGS. 5 and 6 are partial sectional views of glass and metal parts to be sealed in accordance with the invention to form an envelope of an electronic discharge device.

FIG. 7 is a partial sectional view of glass and metal components of an envelope and illustrating the invention.

FIG. 8 is a sectional view of a phototube envelope formed of glass and metal parts.

The manufacture of low-cost mass-produced cathode ray tubes for television utilizes the commercial "soft" (or high thermal expansion) glasses. These glasses are fashioned into bulb and faceplate portions prior to their being joined together to form a tube envelope. For example, FIG. 1 discloses a glass envelope 10 for a television picture tube. The envelope consists of a faceplate cap portion 12, a glass bulb portion 14 and a glass neck portion 16. The cap portions 12 and 14 may be sealed directly together prior to the formation of the phosphor screen of the cathode ray tube on the innersurface of the cap 12. The sealing is normally done with fires directed on the matching adjacent rims of envelope portions 12 and 14. The glass portions are heated to above 800° C., which is well above the softening temperatures of the glass used. The use of such high temperatures, however, necessitates the formation of the phosphor screen on the inner surface of the cap portion 12 after the cap has been joined to the bulb 14 in order to prevent damage of the phosphor screen by the high sealing temperatures. This can be done where the phosphor coating is a single continuous layer by introducing the phosphor through the neck portion 16 as a water suspension in a conventional manner.

However, if the bulb of FIG. 1 is used to form a color television picture tube of the type requiring the several phosphor materials to be put down on the inner surface of cap 12 in a specific pattern, present techniques require this to be done before cap 12 is joined to the bulb portion 14. A successful expedient for joining cap 12 to bulb 14 is one in which a metal flange is sealed to the rim of cap 12 and a second metal flange or ring is sealed to the adjacent matching rim of bulb 14. The metal flanges extend outwardly beyond the peripheries respectively of cap 12 and bulb 14 so that a relatively low temperature welding procedure may be used to hermetically join the matching rims together.

One form of presently used color television picture tube utilizes an apertured metallic mask 18 (FIGS. 1 and 2) mounted in a closely spaced relation adjacent to and conforming with the inner surface of cap 12. On the inner surface of cap 12 is deposited a phosphor coating consisting of triads of phosphor dots, one for each aperture in mask 18 and each triad being positioned in alignment with its respective aperture. Each triad consists of three phosphor dots with each dot formed of a different phosphor which will luminesce with a different colored light when struck by high velocity electrons. The screen 20 with its pattern of phosphor triads of necessity must be formed on the surface of cap 12 before the cap is joined to the envelope bulb portion 14. Also the apertured mask 18 is mounted in its fixed position within cap 12 by joining the mask 18 to a supporting U-shaped ring member 22, which in turn is supported by studs 24, for example, within the cap 12. The mounting of aperture mask 18 in this manner is also done prior to the joining of cap 12 to bulb 14.

The strain point of a glass can be considered, from a practical standpoint, to be the temperature at which there can be first noticed any relief of strains previously set up within the glass, or the strain point can be considered as the temperature to which the glass can be raised without any noticeable distortion or change in the glass. The annealing point, similarly, can be considered as the temperature at which all strains within the glass yield or are relieved and the point above which the glass will start to deform. The glasses used in the formation of bulbs of the type shown in FIG. 1 may be the commercial soft glasses having high thermal expansion, such as Corning glasses numbers 0120, 9010, 9012, and 9014. The annealing points of these glasses are within the range of 430° C. to 460° C. For example, the annealing point of Corning 9010 glass is 442° C. and that of Corning 9012 glass is 435° C. The softening temperatures of these glasses are considerably higher and are those temperatures at which the glass distorts rapidly under its own weight. These temperatures are normally above 600° C. for the soft glasses. Corning 9012 has a softening temperature of 628° C. and Corning 9010 has a softening temperature of 650° C.

Soft enamels or glasses have been used in making glass to glass or glass to metal seals by utilizing them as a solder between the glass parts or the glass and metal parts. These seals have been made by applying the soft glass to one or both sealing surfaces and heating the parts together with the sealing surfaces in contact. In order to seal cap 12 directly to bulb 14 without damaging the phosphor screen, it is necessary that the seal be made at relatively low temperatures not exceeding 430° C. However, prior art seals using glass solders with softening points between 400° C. and 450° C. have usually been made at temperatures not lower than 550° C. to 600° C. These relatively high temperatures would be harmful to the phosphor coating 20 on the inner surface of the faceplate cap 12. Furthermore, the prior art solder glasses having softening temperatures within the temperature range given above are also those which have expansion values above $100 \times 10^7$ degree centigrade. These solder glasses then completely mismatch the soft glasses which are used in the television industry for picture tubes.

It is proposed, in making a glass to glass seal or glass to metal seal, in accordance with the invention, to use a soft solder glass identified as Z-1 and consisting of lead oxide (PbO) between 73% and 81% by weight, boric anhydride ($B_2O_3$) 10% to 15% by weight, zinc oxide or cadmium oxide 4% to 12% by weight and silica ($SiO_2$) 1% to 3% by weight. Soft glasses made up in this range of composition have an expansion value in the order of $95 \times 10^{-7}$/degree centigrade. A specific Z-1 solder glass of this composition is one which has been used successfully in accordance with the invention and consists of 76.5% by weight of lead oxide, 14.5% by weight of boric anhydride, 7% by weight of zinc oxide and 2% by weight of silica. This soldered glass is one having a strain point of around 316° C., an annealing point of 333° C. and a softening point of 392° C. With an expansion value around $95$–$96 \times 10^{-7}$/degree centigrade, this solder glass closely matches the Corning 9012 glass used in color television bulbs, which has an expansion value of $101 \times 10^{-7}$/degree centigrade. Furthermore, the softening point of 392° of this solder glass is considerably below the 405° strain point and 435° annealing point of the 9012 glass.

In accordance with my invention, a solder glass similar to the above described soft solder glass is used for joining the parts of a tube envelope together. For example, to join the cap 12 to the bulb 14 of a tube envelope of the type shown in FIG. 1, one or both of the adjacent matching rims 13 and 15 of the cap and bulb respectively are coated with a frit material consisting of the soft glass disclosed above. The rims 13 and 15 of the two envelope portions are fitted together and the glass parts are rapidly heated to a temperature below the annealing point of the glass parts 12 and 14, but above the softening temperature of the soft glass frit. Pressure is then applied between the cap 12 and bulb 14 of the envelope to tightly force the rims 13 and 15 together while the envelope is maintained at the elevated temperature. With the combination of the temperature and pressure a seal is made in which the soft glass solder adheres to both the cap and bulb portions of the envelope to join them together.

In making seals in accordance with this invention, it has been found necessary that the matching parts of the envelope portions should fit. For example, in FIG. 1 the matching rims 13 and 15 should have a reasonably close fit. It has been found that before applying the soft glass coating to these fitted edges, the fit should be such that a 0.005 inch feeler gauge cannot be pushed between the fitted surfaces of the glass parts. Since the rims 13 and 15 can be easily ground to such a tolerance, this is not considered to present any problem. In grinding the bulb parts, an abrasive grit may be used having grit size between 120 and 400 grit. The particular grit size is not critical. The use of polished surfaces does not appear to be warranted, since a roughened surface appears to produce a better bonding of the solder glass to the bulb glass. The soft glass solder is applied as a water suspension formed by mixing 100 grams of the solder glass in powdered form with about 40 grams of water and ½ gram of bentonite. The glass is powdered to a fineness which will pass through a 325 mesh screen. The glass mixture is blended and then is applied to either both of the glass part rims 13 and 15 respectively or to one of the rims. The soft glass mixture may be applied either by brushing it on or by any other appropriate manner.

As an alternative method of applying the glass solder to the matching glass parts, it has been proposed to preheat the glass parts 12 and 14 and dip the respective rims 13 and 15 into a molten bath of the soft glass solder. This can be done with the soft glass at about 800° C. with a dipping time of a few seconds.

After the glass parts 12 and 14 have been coated, they are fired at the highest possible temperature which will avoid distortion of the parts. This may be done in a bake-out lehr or oven at a temperature of not higher than about 410° C. for the 9012 glass. This temperature is below the 435° C. annealing point of the 9012 glass. This firing firmly sinters the glass powder frit to the rim surfaces of the glass parts, but does not necessarily provide a smooth enamel coating which would result from a higher firing temperature between 425° and 470° C.

Prior to joining the coated glass parts 12 and 14 together by sealing, in accordance with the invention, additional processing of the bulb may be undertaken. For example, if the tube of FIG. 1 is to be used as a black and white television picture tube, the luminescent phosphor coating may be formed on the inner surface of the open cap portion 12, after which the cap can be joined to the bulb 14 in the manner to be described. If the bulb of FIG. 1 is to be used as a color picture tube, of the type described above, the several phosphors may be applied in the triad pattern and the mask electrode 18 may be mounted within the cap 12 prior to its being joined to the bulb 14. The phosphor coatings of either type are baked out at a temperature between 400° and 410° for 30 minutes. This bake-out may be combined with the sintering of the soft glass frit described above.

To form the seal in accordance with the invention, as an example the glass parts 12 and 14 are positioned with their coated rims 13 and 15 respectively in a fitted position. The neck portion 16 of the bulb is attached to an exhaust system so that the air within the bulb and cap portions can be removed. The fitted bulb and cap are then heated rapidly to 425° C., at which temperature they are held for approximately 15 minutes while the bulb 14 is exhausted. At 425° the glass solder coating is softened and upon exhausting the bulb and cap, the atmospheric pressure upon the cap squeezes out part of the soft glass between the matching rims and forces their ground surfaces into intimate contact. With large television bulbs, the sealing pressure obtained by exhausting air from the bulb 14 gives pressures on the seal area in the order of 100 to 500 pounds per square inch. At 425° C. and with this pressure on the seal, the seal between parts 12 and 14 is made. After this time, the sealed bulb may be cooled and processed further.

However, in television tube fabrication it has been found advantageous to first seal the electron gun parts parts into the neck portion 16, so that after the seal between the cap and bulb has been made, the temperature can be dropped to 400° C. and a conventional exhaust or bake-out schedule applied without cooling to room temperature. This involves a continuous exhausting of the bulb while the bulb and tube parts are held at the 400° temperature to remove all the occluded gases from the tube surfaces. The exhaust schedule takes approximately 20 minutes, after which the tube is allowed to cool for 15 minutes to 300° C. at which point the exhaust tubulation is sealed off. The cooling rate of bulb parts after bake-out or sealing should not exceed 10° per minute. More rapid cooling may cause checks in the seal which will produce delayed seal failures. This procedure keeps the tube continuously under vacuum so that the sealed joint between the matching rim portions 13 and 15 remains in compression to produce a strong vacuum-tight bond.

The above described seal is one which was made with Corning 9012 glass and the Z-1 glass frit. The above described procedure has not proved to be excessively critical because of the relatively close matching of the expansion values of the Z-1 solder glass with the 9012 glass parts. The same procedure has also been successfully followed using the Z-1 glass solder with Corning 9010 glass parts. However, the 9010 glass has a higher degree of expansion mismatch with the glass solder than the Corning 9012 glass. Because of the degree of mismatch, which is about $10 \times 10^{-7}$/degree centigrade, the applying of the glass frit to the ground fitted parts is more critical. The flatness of the fitted parts 13 and 15 must be obtained such that the maximum spacing between the parts is no greater than 5 or 10 mils and is preferably less than 2 mils. If the void is greater than these amounts, an excess amount of solder glass is retained between the sealed glass parts and the solder glass may craze. Crazing is a tension failure of the solder glass and is the result of expansion mismatch between the solder glass and the bulb glass. Crazing of the solder glass produces cracks or minute checks in the sealing surface of the glass bulb components, thus weakening these parts. When this condition exists, sealing and exhaust failures are likely to occur. In some cases this defect will result in a delayed failure of the finished bulb. Also if the soft glass coating applied to the matched rims 13 and 15 of FIG. 1, for example, is sintered past a certain point and becomes a continuous glassy coating, it will develop minute cracks after the firing step. These coating cracks are again due to the mismatching of the glass and solder parts and may cause failure of the bulb sooner or later. Accordingly then, the sintering temperature of the 9010 glass parts with the Z-1 glass solder is kept between 400° and 410°. Furthermore, the thickness of application of the Z-1 glass should not exceed 5 to 10 mils fired thickness. After sintering, the sealing of the glass parts of Corning 9010 and Z-1 glass solder may be performed in the manner described above for the Corning 9012 glass.

Where there exists a high degree of expansion mismatch between the tube parts and the solder glass in the order of 10 to $20 \times 10^{-7}$/degree centigrade, it has been found that there is a relationship between the ratio of seal width to the thickness of the seal joint which is dependent upon the component parts, the sealing time, temperature and pressure. A ratio of seal width to thickness of seal joint of 200 to 1 (0.200" seal width/.001" seal thickness) appears to be sufficient for the fabrication of large television picture tubes.

In making low temperature pressure seals of the type described above, it is desirable that the glass solder match or have a lower expansion value than the glass parts to which it is glazed. The Z-1 solder glass is one having a higher expansion characteristic than most of the commercial glasses which are available for tube fabrication. The solder glass frit thus is in tension when the seal is made. However, as described above, a certain amount of mismatching between the solder glass and the glass parts can be tolerated. In general, the thinner the application of the solder glass to the matching glass parts, the greater the expansion mismatch that can be tolerated. Under the controlled conditions described above as to solder glass thickness and temperature treatment, seals can be made using materials having an expansion mismatch in excess of $20 \times 10^{-7}$/degree centigrade and at temperatures considerably lower than those used in the above described sealing process. The main consideration in the use of solder glasses is to keep the sealing temperature below the annealing range of the glasses used. Although successful seals have been made with the Z-1 glasses, under the conditions described above, a solder glass which would permit a decrease in sealing temperatures of approximately 20° C. for the 9012 glass would be preferable.

The above described process utilizes the atmospheric pressure to provide the pressure required to form the seal at low temperatures. In accordance with the invention, however, the method need not be limited to atmospheric pressure, but may utilize any type of mechanical pressure. These pressures may vary from 100 to 7000 pounds per square inch applied to the seal areas. With these pressures, seals of the type described can be made around 400° C. In accordance with the invention, the pressure is that which may be applied externally on the seal area during the formation of the seal. If the device is a closed envelope, the exhausting of the envelope may be utilized before and during sealing, so that the atmospheric pressure can be added to the external pressure which is applied for sealing. However, for large cathode ray tubes of the types shown in FIG. 1, for example, with narrow seal areas in the order of 200 mils, atmospheric pressure due to evacuation of the bulb itself supplies sufficient pressure for sealing and with no additional external pressure needed.

FIG. 3 schematically shows a glass envelope conventionally used for television picture tubes. The envelope 10' may be made up by sealing a cap or faceplate portion 12' to the bulb portion 14', as indicated above for FIG. 1. Alternatively bulb 10' may be a blown bulb in a single piece. In any case the bulb is made up at normal atmospheric pressures so that upon evacuation, after tube processing, considerable pressure A is exerted by the atmosphere on the outer surface of the faceplate 12' and a large inwardly directed pressure B on the bulb wall 14'. The atmospheric pressure on the large areas 12' and 14' of the envelope set up tension strains along the glass envelope surface C and at the corners between areas 12' and 14'. In envelopes used for large television picture tubes, the glass walls are made as thin as possible to minimize the weight of the glass. The relatively thin faceplates bend considerably when the tube is exhausted and areas of the envelope surface particularly in the region C become highly strained. In envelopes made from two pieces—a cap and bulb portion sealed together prior to evacuation of the envelope—there is additionally a severe bending strain on the seal itself when the tube is subsequently exhausted.

However, an envelope made as described above, by low temperature solder-sealing a pre-formed glass cap and bulb, minimizes these problems of tension strains in the glass. As described above, the seal between cap 12 and bulb 14 is made below the annealing temperatures of the glass components 12 and 14 and above the softening point of the solder glass 17 (FIG. 4). When this seal is combined with tube exhaust and bake-out, any displacements of faceplate 12 and bulb 14 inwardly under atmospheric pressure are independent of each other and occur before the seal 17 has set. Thus, no bending strains are supported by the seal 17 and also the strains in surface areas C are minimized, if not entirely relieved as long as the envelope remains evacuated. This results in a much stronger envelope construction with little tension strains present and enables the safe use of thinner glass walls.

FIGS. 5 and 6 disclose a type of envelope for television tubes utilizing a flat plate glass faceplate 30 which is to be sealed to a metal bulb 32 (FIG. 5), or to a glass bulb 34 (FIG. 6). The faceplate 30 is of tempered plate glass such as Pittsburgh Plate Glass Company No. 3720 glass. For a television picture tube having a screen diameter of 19", the glass plate 30 has a thickness in the order of ¼". The glass is purposely tempered to increase the tensile strength of the glass. The tempering is done by using a soaking temperature of around 600° C. or higher, followed by a quenching by immediately cooling the plate in air to room temperature with or without application of forced air. This tempering procedure results in tempering strains which are a surface compression stress in the order of 200 to 3000 pounds per square inch. The tempered plate is one with an increase in over-all resistance towards clamping forces, thermal shock breakage in exhaust, or towards strains set up by processing the tube. This permits the use of thinner glass for the plate 30.

Prior to tempering and to sealing the faceplate 30 to its respective bulb (FIGS. 5 and 6), the periphery of the faceplate is coated with the soft low temperature frit described above. This produces a thin film 36 around the periphery of the glass plate 30. Furthermore, as the film of soft glass is fired down during tempering by heating to temperatures of 600° C. or higher, it becomes a smooth enamel film, relatively free of bubbles. The metal bulb 32 is provided with a flanged portion 38 to match the surface of plate 30. The flange 38 is also coated with a thin film of the soft soldered glass and a seal is made in the manner described above between the glass and metal portions 30 and 32.

The tempered glass faceplate 30 is temperature sensitive. If the plate is heated within the annealing range of the glass, the plate loses its temper or surface compression thus weakening it. Seals made as outlined above in accordance with this invention permits the use of tempered glass parts for discharge tube envelopes with the added advantages of increased bulb strength and lighter weight.

FIG. 6 utilizes an alternative sealing method in which a metal wire 42 such as copper or aluminum is coated with a film 44 of the low melting point solder glass similar to the Z-1 glass set forth above. The rim of the glass bulb portion 34 is coated with a thin film 46 of the solder glass. The sealing of the parts 30 and 34 is performed in the manner described above either with atmospheric pressure alone or a combination of atomspheric and external pressure on the seal area.

FIG. 8 discloses a bulb portion 48 which has been utilized for a phototube. On the inner surface of the faceplate of bulb 48, a photoemissive coating 50 is formed in a well-known manner. A multiplier cage 52 of a spool-like design is mounted by appropriate lead structures on a glass header 54, which in turn is sealed within a retaining ring. In tubes of this type disclosed in FIG. 8, it has been found necessary to form a seal between the retaining ring 56 and the glass envelope 48 at a point sufficiently far removed from the multiplier cage 52 to prevent deterioration of the sensitivity of the dynode surfaces of multiplier 52 by the application of the high temperatures required to form the seals. An application of the sealing method described in this invention to join the retainer ring 56 to the envelope 48 permits a closer spacing of the multiplier cage 52 to the seal area with a resultant shortening of the over-all length of the tube envelope 48.

As shown in FIG. 8, a coating film of soft solder glass 58 is placed on the peripheral rim of the open end of envelope 48, as well as on a flanged portion of ring 56. The coating is in accordance with the above described procedure and prior to the formation of the seal. An exhaust tubulation 60 is provided to exhaust the air from envelope 48 and to aid in providing pressure required to make the seal.

Another application of the invention is illustrated in FIG. 7. A tube envelope is formed from a cap portion including a glass faceplate 66 sealed to a metal rim 64, and a metal bulb portion 62. Rim 64 may be a 17% chromium iron alloy and faceplate 66 is plate glass such as Pittsburgh Plate Glass Company No. 3720 glass. Metal portions 64 and 62 are provided with adjacent matching flanges 65 and 63 respectively, which are formed to fit tightly together. A soft glass, in the composition range described above and having thermal expansion coefficient (0–250° C.) of 100 to $110 \times 10^{-7}$/degree centigrade, is applied to the sealing surfaces of the cap and funnel, and fired on at maximum temperatures of 460 to 500° C. The higher firing temperatures are possible here (without distorting the glass parts) because of the higher annealing point of 3720 glass (527° C.), and also because the sealing surfaces can to some extent be heated locally to these temperatures, while the glass parts sealed to the metal parts are held at somewhat lower temperatures. At these higher firing temperatures, the soft glass layer becomes smooth and nearly free of bubbles of trapped air. The color tube is then assembled by mounting the mask, depositing the phosphor triads, and aluminizing, and an initial seal between the cap and funnel is made, without pressure on the seal, by stacking the parts together and heating to a temperature of 400 to 430° C. This initial seal may be made during the final screen and coating bake operations, which are normally carried out in this temperature range. The bulb is then exhausted on a conventional bake schedule, in which the bulb is heated under vacuum to 400° C., held at this temperature for some time, then cooled and tipped off. The seal between the cap and funnel is thus completed in the exhaust operation, in which the soft glass, being above its softening temperature at the maximum exhaust bake temperature, is squeezed out from between the closely fitting sealing surfaces by the pressures caused by exhaust of air from the bulb.

Glass to metal and glass to glass seals made in the manner described above enable the use not only of smaller and less massive envelope structures, but also enables the application and formation of sensitive coatings and tube elements within the envelope prior to forming the seals. The sealing method described is one giving the highest quality seal with respect to vacuum tightness and at minimum sealing temperatures. The above described sealing process does not bring the glass parts of the tube to the annealing temperatures and therefore eliminates any annealing step for these parts. However, the glass solder which is carried beyond its softening temperature is sufficiently annealed by the slow cooling which is a normal part of the exhaust bake-out schedule for large television picture tubes.

What is claimed is:

1. A method of manufacturing a cathode-ray tube with a metal-backed, phosphor screen, comprising the steps of assembling the tube with an electron gun in position therein, thereafter heating the tube at a temperature at which the metal-backed phosphor screen is baked out, and immediately thereafter evacuating the tube while the heating is continued to outgas its elements.

2. A method of manufacturing a cathode-ray tube comprising the steps of providing a metal-backed phosphor screen within said tube, assembling an electron gun in position within said tube, thereafter heating said tube at a temperature at which gases are driven from said metal-backed screen, and then evacuating the tube while the heating is continued to outgas the electrodes of the electron gun and the other parts of the tube.

3. A method of manufacturing a cathode-ray tube having an envelope including a faceplate and having a metal-backed, phosphor screen, said method comprising the steps of providing said metal backed phosphor screen on said faceplate, assembling an electron gun into said envelope, thereafter heating the tube in an atmosphere and at a temperature at which the metal-backed phosphor screen is baked out, and then evacuating the tube while the heating is continued to outgas its elements.

4. A method of manufacturing a cathode-ray tube having an envelope including faceplate, cone and neck portions and having a metal-backed, phosphor screen, said method comprising the steps of providing said metal-backed phosphor screen on said faceplate portion, assembling an electron gun into said neck portion, applying to the edges of said faceplate and said cone portions a frit material, thereafter assembling the tube by juxtaposing said faceplate and cone portions so that the frit-covered edges abut, thereafter heating the tube in an atmosphere and at a temperature at which said metal-backed phosphor screen is baked out and said frit material is softened to permit the sealing together of said faceplate and cone portions of the tube, and then evacuating the tube while the heating is continued to outgas its elements.

5. A method of manufacturing a cathode-ray tube having an envelope comprising the steps of providing a layer of phosphor material on an internal surface of said envelope, aluminizing said phosphor layer, assembling an electron gun in position within said envelope, heating said tube within an atmosphere and at a temperature at which said aluminized screen is baked out, and then evacuating said tube while the heating is continued to outgas the electrodes of the electron gun and the other parts of the tube.

6. A method of making a cathode-ray tube having a phosphor coating on at least a portion of the interior of said device, said method including the steps of heating said tube for a first time interval to bake out said phosphor coating and said tube to release occluded gases therefrom, then exhausting said tube during a second time interval while maintaining the temperature of said tube at approximately the temperature which said tube reached during the heating step.

7. A method for making a cathode-ray tube having a neck portion and an electron gun mount member having an exhaust tubulation member, said method including the steps of placing a phosphor material in said tube, aluminizing said phosphor material, sealing said electron gun mount member into the neck portion of said cathode ray tube, heating said cathode ray tube for a first time interval to partially degas said cathode ray tube, connecting an exhaust system to said exhaust tubulation member while keeping said cathode ray tube at approximately the same temperature as it reached during the above heating step, and then exhausting said cathode ray tube for a second time interval while heating said cathode ray tube for at least a portion of said second time interval thereby substantially completely degassing said cathode ray tube, and tipping off and sealing said exhaust tubulation member.

8. A method of making a cathode ray tube, said method including the steps of placing a phosphor material within said tube, said phosphor material having occluded gases therein, heating said tube during a first time interval to remove a portion of said gases from said phosphor material and from said tube, connecting an exhaust system to said tube, and without substantially cooling said tube then exhausting said tube for a second time interval while heating said tube for at least a portion of said second time interval thereby removing substantially all of said gases.

9. The method of fabricating and processing a cathode-ray tube having an envelope, said method comprising the steps of providing a phosphor screen on a portion of the inner surface of said envelope, mounting an electron gun within said envelope, heating said tube to bake it out and thus release gases from the internal parts thereof, then without substantially cooling said tube exhausting said tube to complete the bake out and degassing of said parts.

10. The method of fabricating and processing a cathode-ray tube comprising the steps of applying a phosphor screen to an internal portion of the envelope of said tube, aluminizing said screen, mounting an electron gun within said tube, heating said tube to an elevated temperature to bake out and degas the parts thereof before said tube is sealed closed from the atmosphere, then sealing said tube closed from the atmosphere, then while maintaining said tube at an elevated bake-out temperature beginning and continuing exhausting said tube to complete the bake out and degassing thereof.

References Cited in the file of this patent

UNITED STATES PATENTS

| | | |
|---|---|---|
| 2,106,754 | Lederer | Feb. 1, 1938 |
| 2,123,957 | Orth | July 19, 1938 |
| 2,907,619 | Groot et al. | Oct. 6, 1959 |